Patented Mar. 29, 1932

1,851,118

UNITED STATES PATENT OFFICE

FRITZ STRAUB, OF BASEL, HERMANN SCHNEIDER, OF RIEHEN, NEAR BASEL, AND HANS MAYER, OF BASEL, SWITZERLAND, ASSIGNOR TO SOCIETY OF CHEMICAL INDUSTRY IN BASLE, OF BASEL, SWITZERLAND

DYESTUFFS CONTAINING METAL AND PROCESS OF MAKING SAME

No Drawing. Application filed September 12, 1928, Serial No. 305,610, and in Switzerland September 24, 1927.

The present invention relates to the manufacture of dyestuffs containing metal. It comprises the process of making these dyestuffs, the dyestuffs themselves, and the material dyed with the new dyestuffs.

Hitherto it has often not been possible to convert ortho-hydroxy-azo-dyestuffs in a smooth manner into their complex metal compounds by treating the said dyestuffs in an alkaline medium with such hydroxides of metals forming complex compounds which are insoluble in alkalies.

By this invention dyestuffs containing metal are made by treating an azo-dyestuff containing one or more groups capable of combining with metal, or a mixture of two or more of such dyestuffs, with a metal compound obtainable by reaction in presence of a caustic alkali between, an organic compound containing hydroxyl groups and a hydroxide of a metal which is capable of forming complex metal compounds, which hydroxides are insoluble in caustic alkali, it having been found that these metal compounds are particularly suitable for introducing these metals into the molecule of a dyestuff.

Such organic compounds containing hydroxyl groups are, for example polyhydric alcohols, or phenols, tannins, saccharides, derivatives of cellulose, lignines, and the like, and hydroxides of metals, which come into consideration are inter alia those of copper, iron, cobalt, nickel, manganese, titanium, and so on. With the aid of these products the reaction proceeds much more smoothly than with the simple hydroxides which are not soluble, and the manufacture of the new products is conducted in a simple manner by heating the dyestuff with a solution or suspension of the metal compound.

The dyestuffs containing metal obtainable in accordance with the invention are different from and superior to the dyestuffs containing the same metal but made by other processes.

The invention is applicable to the production of simple metal compounds of mono-azodyestuffs or of poly-azo-dyestuffs, and to the production of mixed metal compounds of such dyestuffs, containing more than one metal (compare specifications Serial No. 301,165, and 305,135).

The following examples illustrate the invention the parts being by weight.

*Example 1.*—24.9 parts of crystallized copper sulphate are dissolved in 500 parts of water and the copper is precipitated in the form of blue copper hydroxide-hydrate at ordinary temperature by the addition of a slight excess of a solution of caustic soda. The precipitate is filtered and washed and then dissolved in a mixture of 75 parts of water, 25 parts of potassium hydroxide and 8 parts of glycerine (compare Gmelin-Kraut, Handbuch der anorgan. Chemie, 7th Edition, Volume V, p. 775 et. seq.).

12.77 parts of the dyestuff from diazotized 5-nitro-2-amino-1-phenol and ortho-anisyl-2-amino-5-hydroxynaphthalene-7-sulfonic acid of the formula

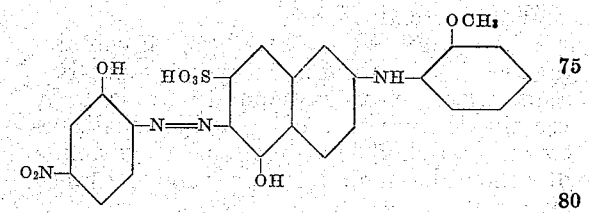

are dissolved in 500 parts of water with the addition of 3 parts of caustic potash. The solution so obtained is mixed with 55 parts of the solution containing copper prepared as above described, previously diluted with water to 200 parts; the mixture is heated to boiling for some time. The copper compound of the dyestuff is quickly formed and dissolves to a pure blue solution. The solution is cooled, the dyestuff precipitated completely by neutralizing the solution, separated by filtration and washed. When dried it is a dark brown powder having a bronze lustre; it is soluble in hot water to a pure blue solution. The dyestuff dyes cotton in a neutral bath reddish blue shades of very good fastness to light.

*Example 2.*—13 parts of cobaltous chloride are dissolved in 200 parts of water and the solution is mixed with 10 parts of glycerine. There are then added successively a solution of 15 parts of caustic potash in 15 parts of water, and 55 parts of a dyestuff paste of 43% strength (1/20th molecular proportion) of the dyestuff from diazotized 2-amino-1-hydroxy-naphthalene-4:8-disulphonic acid, and β-naphthol of the formula

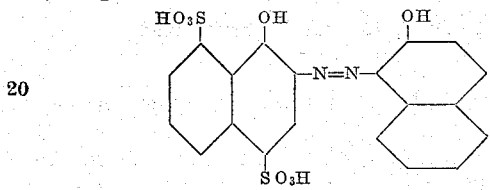

After boiling the mixture for 6 hours in a reflux apparatus, there is added a solution of 25 parts of caustic potash in 25 parts of water, and the whole is boiled for a further 15 hours, after which it is diluted to 500 parts, filtered, neutralized by addition of acetic acid, and salted out. The cobalt compound of the dyestuff which is thus precipitated in crystalline form is, when dried, a brown violet powder having a faintly bronze appearance; it dissolves in water and in caustic soda lye of 10 per cent strength to a violet solution, and in concentrated sulphuric acid to a blue violet solution. In an acetic acid bath it dyes wool and silk in red violet shades of good fastness.

In a similar manner one proceeds with other azo-dyestuffs and the derivatives soluble in alkali which the polyhydric alcohols, or phenols, tannins, saccharides, derivatives of cellulose, lignines, and so on, yield with the hydroxides of iron, manganese, titanium, and so on.

What we claim is:—

1. A manufacture of azo-dyestuffs containing metal by treating ortho-hydroxy-azo-dyestuffs with a metal compound obtainable by reaction, in presence of a caustic alkali, between a polyhydric alcohol and a hydroxide of a metal having an atomic weight between 59 and 64.

2. A manufacture of azo-dyestuffs containing metal by treating ortho-hydroxy-azo-dyestuffs with a metal compound obtainable by reaction, in presence of a caustic alkali, between glycerine, and a hydroxide of copper.

3. As new products the azo-dyestuffs containing such metals the hydroxides of which are insoluble in caustic alkalies, which products are obtained by treating ortho-hydroxy-azo-dyestuffs with a metal compound obtainable by reaction, in presence of a caustic alkali, between a polyhydric alcohol and a hydroxide of a metal having an atomic weight between 59 and 64.

4. As new products the ortho-hydroxy-azo-dyestuffs containing copper, which are obtained by treating ortho-hydroxy-azo dyestuffs with a metal compound obtainable by reaction, in presence of a caustic alkali, between glycerine and a hydroxide of copper.

In witness whereof we have hereunto signed our names this 31st day of August, 1928.

FRITZ STRAUB.
HERMANN SCHNEIDER.
HANS MAYER.